United States Patent
Koshigoe et al.

(10) Patent No.: US 8,043,711 B2
(45) Date of Patent: Oct. 25, 2011

(54) ALUMINUM ALLOY CLAD SHEET FOR A HEAT EXCHANGER AND ITS PRODUCTION METHOD

(75) Inventors: Fumihiro Koshigoe, Moka (JP); Toshiki Ueda, Moka (JP); Shimpei Kimura, Moka (JP); Masao Kinefuchi, Kobe (JP); Katsushi Matsumoto, Kobe (JP); Eiichi Tamura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/335,950

(22) Filed: Dec. 16, 2008

(65) Prior Publication Data

US 2009/0165901 A1   Jul. 2, 2009

(30) Foreign Application Priority Data

Dec. 27, 2007   (JP) .................. 2007-338167

(51) Int. Cl.
- *B32B 9/04* (2006.01)
- *B32B 15/04* (2006.01)
- *B32B 15/20* (2006.01)
- *B32B 15/01* (2006.01)

(52) U.S. Cl. .............. 428/457; 428/411.1; 428/654; 228/262.5; 228/262.51

(58) Field of Classification Search .......... 428/457, 428/654, 411.1; 228/262.5, 262.51
See application file for complete search history.

(56) References Cited

U.S. PATENT DOCUMENTS

| | | | |
|---|---|---|---|
| 5,744,255 | A | 4/1998 | Doko et al. |
| 7,387,844 | B2 | 6/2008 | Ueda et al. |
| 2006/0134451 | A1 | 6/2006 | Saisho et al. |
| 2009/0020276 | A1 | 1/2009 | Ueda et al. |

FOREIGN PATENT DOCUMENTS

| | | |
|---|---|---|
| EP | 0 637 481 A1 | 2/1995 |
| JP | 8-60280 | 3/1996 |
| JP | 9-95749 | 4/1997 |
| JP | 2004-17116 | 1/2004 |
| WO | WO/ 00/ 05426 * | 2/2000 |

OTHER PUBLICATIONS

U.S. Appl. No. 12/519,023, filed Jun. 12, 2009, Ueda, et al.
U.S. Appl. No. 11/909,168, filed Sep. 20, 2007, Ueda, et al.*
U.S. Appl. No. 12/867,127, filed Aug. 11, 2010, Matsumoto, et al.
U.S. Appl. No. 13/037,543, filed Mar. 1, 2011, Ueda, et al.
U.S. Appl. No. 13/099,695, filed May 3, 2011, Kimura, et al.

* cited by examiner

*Primary Examiner* — James J Seidleck
*Assistant Examiner* — Saira B Haider
(74) *Attorney, Agent, or Firm* — Oblon, Spivak, McClelland, Maier & Neustadt, L.L.P.

(57) ABSTRACT

Disclosed herein is an aluminum alloy clad sheet for a heat exchanger including a core layer, a sacrificial layer formed on one surface of the core layer, and a filler layer including an Al—Si based alloy formed on the other surface of the core layer. The core layer includes a predetermined amount of Si, Cu, Mn, Ti, and Mg, the remainder including Al and inevitable impurities, and the sacrificial layer includes a predetermined amount of Si, Mn, and Zn, the remainder including Al and inevitable impurities. The core layer has a crystal grain size after the brazing heat treatment at 595° C. for 3 minutes of at least 50 μm and less than 300 μm. The filler layer and the sacrificial layer are defined for their thickness, and the number of intermetallic compounds in the core layer is also defined to a predetermined range. By such constitution, the aluminum alloy clad sheet has improved fatigue life and post-braze strength, high corrosion resistance, and excellent erosion resistance and brazeability.

4 Claims, 3 Drawing Sheets

ALUMINUM ALLOY CLAD SHEET FOR A HEAT EXCHANGER AND ITS PRODUCTION METHOD

BACKGROUND OF THE INVENTION

1. Field of the Invention

This invention relates to an aluminum alloy clad sheet used for an automobile heat exchanger. This invention also relates to its production method.

2. Description of the Related Art

In producing a tube for an automobile heat exchanger such as evaporator or condenser, an aluminum alloy brazing sheet (hereinafter also referred to as a clad sheet) is generally used for the production.

Various aluminum alloy clad sheets have been disclosed for such application, and an exemplary such clad sheet is an aluminum alloy clad sheet including a core layer including an aluminum alloy, a filler layer including an Al—Si-based alloy formed on one surface of the core layer, and a sacrificial anode material layer including an Al—Zn-based alloy formed on the other surface of the core layer. In this clad sheet, fatigue life (fatigue strength), corrosion resistance, erosion resistance, brazeability, and the like have been improved by limiting the composition of the core layer, the filler layer, and the sacrificial anode material (see, for example, Japanese Patent Application Laid-Open Nos. H8-60280, H9-95749, and 2004-17116).

Conventional clad sheet, however, suffered from the problems as described below.

The clad sheets described in Japanese Patent Application Laid-open Nos. H8-60280 and H 9-95749 had the problem that their use was difficult for a brazing tube in which the surface of the filler layer would be joined with the surface of the sacrificial layer since the sacrificial layer had magnesium added thereto. The clad sheet of Japanese Patent Application Laid-open No. 2004-17116 suffers from the risk of the loss of post-braze strength and the loss of fatigue life (fatigue strength) since average crystal grain size of the core layer after the brazing heat treatment is at least 300 μm.

In the automobile heat exchanger, attempts have been made to reduce the thickness of the clad sheet. However, further reduction in the thickness is strongly requested for reducing the weight, size, and cost of the heat exchanger. In order to reduce the thickness, the clad sheet should have an improved fatigue life and post-braze strength as well as high corrosion resistance and good erosion resistance, and brazeability.

While the level of the fatigue life, post-braze strength, corrosion resistance, erosion resistance, and brazeability has been improved in the conventional clad sheets, there is a demand for the development of a clad sheet having an even more improved fatigue life and post-braze strength and higher corrosion resistance as well as excellent erosion resistance and brazeability in order to realize the reduced thickness of the clad sheet.

SUMMARY OF THE INVENTION

The present invention has been completed in view of such situation, and the present invention provides an aluminum alloy clad sheet used for a heat exchanger having improved fatigue life and post-braze strength, high corrosion resistance, and excellent erosion resistance and brazeability as well as its production method.

Accordingly, in a first aspect, the aluminum alloy clad sheet for a heat exchanger of the present invention includes a core layer, a sacrificial layer formed on one surface of the core layer, and a filler layer including an Al—Si based alloy formed on the other surface of the core layer. The core layer includes 0.5 to 1.1 mass % Si, 0.5 to 1.1 mass % Cu, at least 0.05 mass % and less than 0.6 mass % Mn, 0.05 to 0.25 mass % Ti, up to 0.45 mass % Mg, and the remainder of Al and inevitable impurities. The sacrificial layer includes in excess of 0.5 mass % and up to 1.1 mass % Si, 0.001 to 1.7 mass % Mn, 3.0 to 6.0 mass % Zn, and the remainder of the Al and inevitable impurities. The core layer has a crystal grain size after brazing heat treatment at 595° C. for 3 minutes of at least 50 μm and less than 300 μm. The filler layer has a thickness of 20 to 55 μm, and the sacrificial layer has a thickness of 25 to 50 μm. The Al—Mn, Al—Mn—Si, Al—Fe, Al—Fe—Si, and Al—Mn—Fe—Si-based intermetallic compounds in the core layer are distributed such that those having a diameter in terms of sphere of 0.65 to 15 μm is present at up to $5\times10^3$ grains per $mm^2$, and those having a diameter in terms of sphere in excess of 15 μm is present at up to 50 grains per $mm^2$.

In such constitution, the addition of the Si, Cu, Mn, Ti, and Mg to the core layer at a predetermined amount, and the addition of the Si, Mn, and Zn to the sacrificial layer at a predetermined amount results in the improvement of the fatigue life, post-brazing strength, and corrosion resistance. The control of the crystal grain size of the core layer after the brazing heat treatment at 595° C. for 3 minutes to the range of at least 50 μm and less than 300 μm suppresses the decrease in the post-brazing strength and improves the erosion resistance. Limitation of the thickness of the filler layer to a predetermined degree prevents the reaction between the Mg diffused from the core layer and the flux coated on the surface of the filler layer, and controls the flowing amount of the filler layer to an appropriate degree. Limitation of the thickness of the sacrificial layer to a predetermined degree secures the difference of electrical potential between the sacrificial layer and the core layer and improves the corrosion resistance. This also prevents the reaction between the Mg diffused from the core layer and the flux coated on the surface of the filler layer in the joining of the filler layer and the sacrificial layer, and prevents loss of the brazeability. The intermetallic compound is prevented from becoming the starting point of the cracks generated by the fatigue of the clad sheet by limiting the number of intermetallic compound of particular grain size present in the core layer.

In a second aspect, a method for producing the aluminum alloy clad sheet for a heat exchanger is for producing the aluminum alloy clad sheet for a heat exchanger of the first aspect, and this method includes the steps of preparing the members used for the clad sheet, the step of laminating such members, the step of heat treatment, the step of hot rolling, the step of first cold rolling, the step of intermediate annealing, and the step of second cold rolling. In the steps of preparing the members used for the clad sheet, a soaking heat treatment is conducted at a temperature in the range of 440 to 570° C. for at least 2 hours, and in the second cold rolling step, the sheet is rolled to a cold working rate in the range of 20 to 65%.

In such production method, a member for the core layer, a member for the sacrificial layer, and a member for the filler layer are prepared in the clad member preparation step; the member for the core layer, the member for the sacrificial layer, and the member for the filler layer are placed one on another at the predetermined arrangement to prepare a laminate in the laminating step; the laminate is heat treated (reheated) in the heat treating step; the thus heat treated laminate is hot rolled in the hot rolling step; the thus hot rolled laminate is cold rolled in the first cold rolling step; the thus cold rolled laminate is subjected to the intermediate annealing in the intermediate annealing step; and the laminate that has been subjected to the intermediate annealing is cold rolled in the second cold rolling step. By conducting the soaking heat treatment in the preparation of the member for the core layer under predetermined conditions and controlling the cold working rate in the second cold rolling step to the predetermined range, the crystal grain size of the core layer after the brazing heat treatment is controlled to the range of at least 50 µm and less than 300 µm; and by conducting the soaking heat treatment in the preparation of the member for the core layer under predetermined conditions, the number of various intermetallic compounds having the predetermined grain size in the core layer is controlled.

The method for producing the aluminum alloy clad sheet for a heat exchanger of the second aspect further includes a finish annealing step in which the annealing is conducted at a temperature of up to 300° C. for up to 5 hours after the second cold rolling step.

In this production method, the finishing annealing carried out under the predetermined conditions results in the softness of the clad sheet, and the clad sheet will have an improved elongation and formability by.

In the aluminum alloy clad sheet for a heat exchanger of the first aspect of the present invention, the fatigue life, the post-brazing strength, and the corrosion resistance can be improved together with the erosion resistance and the brazeability by incorporating the predetermined elements at predetermined amount and controlling the crystal grain size of the core layer after the brazing heat treatment to a predetermined range.

The method for producing the aluminum alloy clad sheet for a heat exchanger of the second aspect of the present invention is capable of controlling the crystal grain size of the core layer after the brazing heat treatment and the number of the intermetallic compound in the core layer to a predetermined degree to thereby enable production of an aluminum alloy clad sheet for a heat exchanger having excellent fatigue life, post-brazing strength, corrosion resistance, erosion resistance, and brazeability.

BRIEF DESCRIPTION OF THE DRAWINGS

Embodiment(s) of the present invention will be described in detail based on the following figures, wherein.

DETAILED DESCRIPTION OF THE INVENTION

Figure 1:
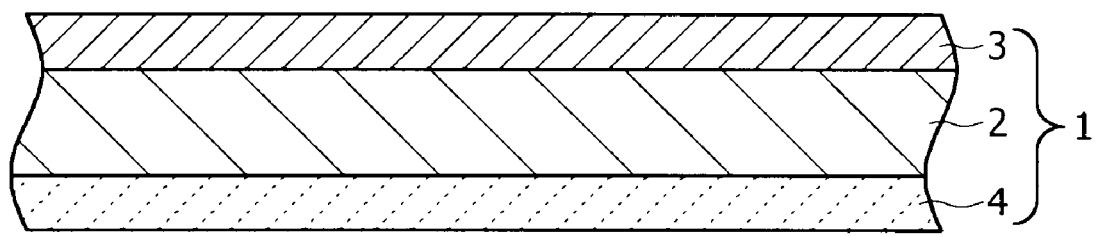
FIG. 1 is a cross-sectional view showing the constitution of the aluminum alloy clad sheet for a heat exchanger of the present invention.
Figure 2:
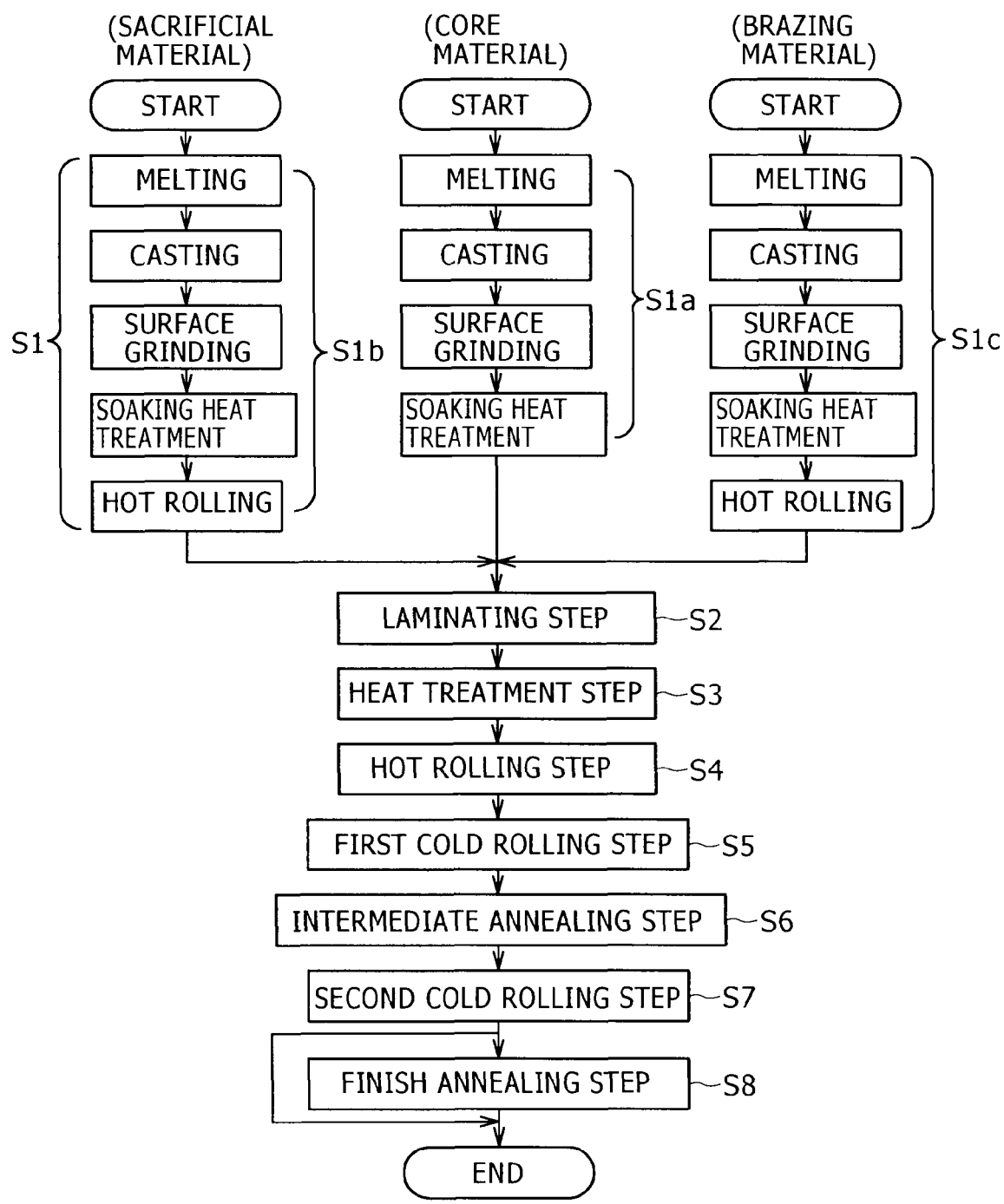
FIG. 2 is a flow diagram showing the production process of the aluminum alloy clad sheet for a heat exchanger.

Next, the aluminum alloy clad sheet for a heat exchanger of the present invention is described in detail by referring to the drawings. In the drawings referred, FIG. 1 is the cross-sectional view showing the structure of the aluminum alloy clad sheet for a heat exchanger of the present invention. FIG. 2 is a flow diagram of the method for producing the aluminum alloy clad sheet for a heat exchanger.

An exemplary aluminum alloy clad sheet (hereinafter also referred to as a clad sheet) for a heat exchanger of the present invention is the three layer aluminum alloy clad sheet for a heat exchanger (hereinafter also referred to as a clad sheet) 1 shown in FIG. 1 including a core layer 2, a sacrificial layer 3 disposed on one surface of the core layer 2, and a filler layer 4 formed on the other surface of the core layer 2.

Next, the reason for the limitation of the content of the alloying components in the core layer 2, the sacrificial layer 3, and the filler layer 4 constituting the clad sheet 1 as well as crystal grain size of the core layer 2 are described.

[Core Layer]

The core layer 2 includes 0.5 to 1.1 mass % Si, 0.5 to 1.1 mass % Cu, at least 0.05 mass % and less than 0.6 mass % Mn, 0.05 to 0.25 mass % Ti, up to 0.45 mass % Mg, and the remainder of Al and inevitable impurities.

<Si: 0.5 to 1.1 Mass %>

Si forms an intermetallic compound with the Al and Mn to become minutely distributed in the grain and contributes for the dispersion strengthening. When the content of Si is less than 0.5 mass %, the effect of improving the post-brazing strength will be insufficient, and the Al—Mn-based compound is likely to be precipitated at the grain boundary to result in the poor internal corrosion resistance. On the other hand, when the Si content exceeds 1.1 mass %, solidus temperature will be reduced and the clad sheet 1 will melt during the brazing and brazing can not be accomplished. The more preferable content is 0.6 to 1.0 mass %.

<Cu: 0.5 to 1.1 Mass %>

Cu has the effect of improving the post-brazing strength. Addition of Cu also has the effect of improving the corrosion resistance since its addition increases the electrical potential and difference in the electrical potential between the core layer 1 and the sacrificial layer 3 will be greater.

When the Cu content is less than 0.5 mass %, difference in the electrical potential between the core layer 1 and the sacrificial layer 3 will be insufficient, and the clad sheet 1 will have a poor internal corrosion resistance. The effect of improving the post-brazing strength will also be insufficient. On the other hand, when the Cu content exceeds 1.1 mass %, solidus temperature will be reduced and the clad sheet 1 will melt during the brazing and brazing can not be accomplished. The more preferable content is 0.6 to 1.0 mass %.

<Mn: at Least 0.05 Mass % and Less Than 0.6 Mass %>

Mn has the effect of improving the post-brazing strength, and its addition at an appropriate amount can improve the post-brazing strength.

When the Mn content is less than 0.05 mass %, number of the intermetallic compound that Mn forms with the Al and Si will be reduced, and the post-brazing crystal grain size will be increased to invite decrease in the post-brazing strength, and hence, poor fatigue life. On the other hand, when the Mn content is 0.6 mass % or higher, a large number of intermetallic compounds will be generated and such compound may become the starting point of cracks, resulting in the shorter fatigue life. The more preferable content is 0.2 to 0.6 mass %.

<Ti: 0.05 to 0.25 Mass %>

Ti is distributed in the core layer 2 in lamellar form, and greatly improves the internal and external corrosion resistance. When the Ti content is less than 0.05 mass %, such lamellar distribution is not formed, and the effect of improving the corrosion resistance will be insufficient. On the other hand, when the Ti content exceeds 0.25 mass %, coarse intermetallic compound will be formed, and this invites loss of the corrosion resistance. The more preferable content is 0.1 to 0.2 mass %.

<Mg: Up to 0.45 Mass %>

Mg precipitates with the Si to form Mg Si and improve the post-brazing strength. When the content of the Mg exceeds 0.45 mass %, the flux will react with the Mg, and the effect of the flux for removing the oxide film will be reduced, resulting in the loss of the brazeability. On the other hand, when the Mg content is less than 0.05 mass %, the effect of improving the post-brazing strength will be insufficient. Addition of at least 0.05 mass % is preferable, and the more preferable content is up to 0.40 mass %.

<Remainder: Al and Inevitable Impurities>

The core layer 2 includes the components as described above, and the remainder includes the Al and inevitable impurities. Typical inevitable impurities include, for example, up to 0.2 mass % each of Fe, Cr, and Zr. Inclusion of such component is acceptable in the present invention as long as there is no adverse effect in the merits of the present invention.

<Crystal Grain Size of the Core Layer>

In the present invention, the core layer has a crystal grain size after the brazing heat treatment at 595° C. for 3 minutes of at least 50 μm and less than 300 μm.

Limitation of the crystal grain size of the core layer 2 to such range will improve erosion resistance and post-brazing strength.

In the present invention, the term "crystal grain size" means average of the crystal grain size (average crystal grain size).

The condition of the brazing heat treatment "595° C. for 3 minutes" is the condition of the heat treatment used as the standard condition for measuring the crystal grain size of the present invention. The condition of the heat treatment under which the clad sheet of the present invention is actually brazed is not limited to such conditions, and the brazing heat treatment may be conducted under any appropriate conditions.

When the crystal grain size of the core layer is less than 50 μm, the increased grain boundary will allow dispersion of the Si in the filler layer during the brazing, and erosion occurs due to the reduced erosion resistance. On the other hand, the crystal grain size of 300 μr greater will result in the loss of the post-brazing strength.

Accordingly, the crystal grain size of the core layer after the brazing heat treatment at 595° C. for 3 minutes is at least 50 μm and less than 300 μm, and preferably, in the range of 100 to 200 μm. When the crystal grain size of the core layer is in the range of 100 to 200 μm, both the erosion resistance and the post-brazing strength will be sufficient.

The crystal grain size in the texture of the core layer 2 may be controlled such that the core layer has a crystal grain size after the brazing heat treatment at 595° C. for 3 minutes of at least 50 μm and less than 300 μm by limiting the composition to the predetermined range; and as described below, by appropriately selecting the conditions of the soaking heat treatment of the core layer 2 (namely, the ingot for the core layer); and by adjusting the finish working rate in the final cold rolling (namely, the cold working rate (cold rolling rate) in the second cold rolling step) after laminating with the sacrificial layer 3 (namely, the member for the sacrificial layer) and the filler layer 4 (namely, the member for the filler layer) and conducting the intermediate annealing. The soaking heat treatment and the cold rolling rate will be further described in the following section.

The measurement of the crystal grain size can be conducted by the procedure described in JIS H: 0501 7. Cutting method.

More specifically, a picture of the surface of the core layer 2 is taken by an optical microscope, and after drawing a line on the picture in the direction of the rolling, the number of crystal grains on the line was counted.

In the clad sheet 1, the Al—Mn, Al—Mn—Si, Al—Fe, Al—Fe—Si, and Al—Mn—Fe—Si-based intermetallic compounds in the core layer are distributed such that those having a diameter in terms of sphere of 0.65 to 15 μm is present at up to $5 \times 10^3$ grains per $mm^2$, and those having a diameter in terms of sphere in excess of 15 μm is present at up to 50 grains per $mm^2$.

When the intermetallic compound having a diameter in terms of sphere of 0.65 to 15 μm exceeds $5 \times 10^3$ grains per $mm^2$, or the intermetallic compound having a diameter in excess of 15 μm exceeds 50 grains per $mm^2$, fatigue of the clad sheet 1 is likely to result in the formation of cracks in the clad sheet 1 originating from such intermetallic compound, and this results in the insufficient the fatigue life.

Such control of the intermetallic compound can be accomplished by limiting the composition to predetermined range and by appropriately limiting the condition of the soaking heat treatment of the core layer 2 (the ingot for the core layer) in the step of preparing the clad sheet.

<Sacrificial Layer>

The sacrificial layer includes in excess of 0.5 mass % and up to 1.1 mass % Si, 0.001 to 1.7 mass % Mn, 3.0 to 6.0 mass % Zn, and the remainder of the Al and inevitable impurities.

<Si: in Excess of 0.5 Mass % and Up to 1.1 Mass %>

Si forms an intermetallic compound with the Mn and Al and contributes for the improvement in the post-brazing strength by dispersion strengthening as well as solid solution strengthening. When the content of Si is up to 0.5 mass %, contribution for the improvement of the strength will be insufficient, and precipitation of the Al—Mn-based intermetallic compound at the grain boundary will result in the loss of the corrosion resistance. On the other hand, when the Si content exceeds 1.1 mass %, solidus temperature will be reduced and the clad sheet 1 will melt during the brazing and brazing can not be accomplished. The more preferable content is 0.6 to 1.0 mass %.

<Mn: 0.001 to 1.7 Mass %>

In addition to the contribution for the improvement in the post-brazing strength by dispersion strengthening through the formation of the intermetallic compound with the Al and the Si, Mn also suppresses precipitation of the elementary Si at the grain boundary, and this contributes for the improvement in the corrosion resistance. When the content of Mn is less than 0.001 mass %, the effect of suppressing the precipitation of the elementary Si at the grain boundary will not be realized. On the other hand, when the Mn content is in excess of 1.7 mass %, intermetallic compounds having a relative large size will be distributed in the sacrificial layer 3, and this results in the loss of the internal corrosion resistance. The more preferable content is 0.001 to 0.5 mass %.

<Zn: 3.0 to 6.0 Mass %>

Zn is an element which reduces the electrical potential, and addition of Zn to the sacrificial layer 3 results in the sufficient difference in the electrical potential between the sacrificial layer 3 and the core layer 2, and this results in the improved internal corrosion resistance. When the Zn content is less than 3.0 mass %, the difference in the electrical potential between the sacrificial layer 3 and the core layer 2 will be insufficient for realizing the internal corrosion resistance. On the other hand, when the Zn content exceeds 6.0 mass %, solidus temperature will be reduced and the clad sheet 1 will melt during the brazing and brazing can not be accomplished. The more preferable content is 3.5 to 5.0 mass %.

<Remainder: Al and Inevitable Impurities>

The sacrificial layer 3 includes the components as described above, and the remainder includes the Al and inevitable impurities. Typical inevitable impurities include, for example, up to 0.2 mass % each of Fe, Cr, and Zr, and up to 0.1 mass % each of In and Sn. Inclusion of such component is acceptable in the present invention as long as there are no adverse effects in the merits of the present invention.

<Thickness of the Sacrificial Layer>

Thickness of the sacrificial layer 3 is in the range of 25 to 50 µm.

The sacrificial layer 3 is essential for realizing the internal corrosion resistance required for the tube material of the automobile heat exchanger such as radiator. The preferential corrosion of the sacrificial layer 3 suppresses corrosion of the core layer 2, and the corrosion resistance is thereby secured. When the thickness of the sacrificial layer 3 is less than 25 µm, the corrosion resistance will be lost even if the Zn content were within the scope of the present invention since the absolute amount of the Zn in the sacrificial layer 3 will be insufficient and it will be difficult to realize the difference in the electrical potential between the sacrificial layer 3 and the core layer 2. When the thickness is less than 25 µm, the Mg that has diffused from the core layer 2 will react with the flux on the sacrificial layer 3 and the effect of the flux for removing the oxide film will be reduced, and this results in the poor brazeability in the joint of the filler layer 4 with the sacrificial layer 3. On the other hand, when the thickness of the sacrificial layer 3 is in excess of 50 µm, amount of the Zn that diffuses to the core layer 2 will increase, and the clad sheet will have reduced electrical potential, and this results in the faster corrosion rate and reduced corrosion resistance.

<Filler Layer>

The filler layer 4 includes an Al—Si-based alloy. Exemplary Al—Si-based alloys include JIS alloys such as 4343 and 4045. The term "Al—Si-based alloy" also includes Al alloys containing Zn in addition to the Si, and accordingly, exemplary Al—Si-based alloys include Al—Si-based alloys and Al—Si—Zn-based alloys, for example, an Al—Si-based alloy containing 7 to 12 mass % Si.

When the content of Si is less than 7 mass %, amount of the Al—Si in liquid phase at the brazing temperature will be insufficient, and this often invites loss of the brazeability. On the other hand, when the Si content is in excess of 12 mass %, coarse primary crystal of Si will increase in the casting of the member used for the filler layer and excessive melting at the boundary between the core layer 2 and the filler layer 4 is likely to occur when formed into the clad sheet 1, and this often results in the loss of the post-brazing strength and the corrosion resistance.

However, the filler layer 4 is not particularly limited, and it may be any of the Al—Si-based (or the Al—Si—Zn-based) alloys commonly used in the art may be used. The filler layer 4 may also contain, for example, Fe, Cu, Mn, Mg, or the like in addition to the Si and Zn.

<Thickness of the Filler Layer>

The thickness of the filler layer 4 is in the range of 20 to 55 µm.

The filler layer 4 is necessary for the brazing. The filler layer partly starts to melt at 577° C. and the liquid phase starts to flow as the filler, and the brazing is accomplished by means of this filler filled at various joints. When the thickness of the filler layer 4 is less than 20 µm, amount of the flowable filler during the brazing will be insufficient, and the brazing can not be fully accomplished due to the insufficient formation of the fillet. Also, the Mg diffusing from the core layer 2 will react with the flux on the surface of the filler layer 4, and this results in the loss of the ability of the flux to break the oxide film, and hence, in the loss of the brazeability. On the other hand, when the thickness exceeds 55 µm, amount of the flowable filler will increase to the extent that the core layer 2 would melt during the brazing.

Next, the production method (the production steps) of aluminum alloy clad sheet for a heat exchanger is described by referring to FIG. 2.

First, the aluminum alloy for the core layer, the aluminum alloy for the sacrificial layer, and the aluminum alloy for the filler layer are respectively melted and casted by continuous casting, and after grinding the surface (surface smoothing treatment), the soaking heat treatment is carried out to produce an ingot for the core layer (the member for the core layer), an ingot for the sacrificial layer, and an ingot for the filler layer. In the case of the ingot for the core layer, the soaking heat treatment after the surface grinding is critical for controlling the crystal grain size after the brazing heat treatment to the range of at least 50 µm and up to 300 µm, and the heat treatment is conducted under the condition of 440 to 570° C. (preferably at 480 to 540° C.) for at least 2 hours (preferably, for at least 2 hours and up to 8 hours). In the case of the ingot for the sacrificial layer and the ingot for the filler layer, the ingots are respectively subjected to the surface grinding, the soaking heat treatment (preferably at 480 to 520° C. for 2 to 8 hours), and the hot rolling to the predetermined thickness to produce the member for the sacrificial layer and the member for the filler layer. [The preparation step for the clad sheet: S1, the preparation step for the member for the core layer: S1a, the preparation step for the member for the sacrificial layer: S1b, the preparation step for the member for the filler layer: S1c]

Next, the member for the core layer, the member for the sacrificial layer, and the member for the filler layer are laminated in the laminating step (S2), and the laminate is heat treated (reheated) in the heat treatment step (S3) at a temperature of at least 440° C. and less than the temperature of the soaking heat treatment of the core layer, and pressed in the hot rolling step (S4) to produce the sheet material. The laminate is then subjected to the first cold rolling step (S5), the intermediate annealing step (S6), and the second cold rolling step (final cold rolling step) (S7) until the sheet has the predetermined thickness.

The intermediate annealing in the intermediate annealing step (S6) is preferably conducted under the condition of 350 to 400° C. for 2 to 4 hours, and the finish working rate (the cold rolling rate) in the second cold rolling step (S7) is controlled to the range of 20 to 65% to control the crystal grain size after the brazing heat treatment to the range of at least 50 µm and less than 300 µm.

After working to the final thickness, the sheet may be further subjected to the finishing annealing in the finishing annealing step (S8) under the condition of at up to 300° C. for up to 5 hours for improving formability and the like.

By this finishing annealing, the clad sheet becomes soft with improved elongation, and accordingly, this finishing annealing is a step suitable for improving the formability of a tube and other articles.

However, when the finishing annealing is conducted and the temperature of the finishing annealing exceeds 300° C., recrystallization occurs in some parts of the sheet (partial recrystallization of the work structure), and such simultaneous presence of the work structure and the recrystallized structure results in the work strain during the production of the tube or the like, and the subgrains will remain in the brazing, and this induces the erosion. When the erosion occurs, the filler would rather diffuse into the subgrains instead of flowing along the surface, and the filler necessary for the fillet formation will be insufficient, and this results in the poor brazeability. Furthermore, when the erosion occurs by the excessively high temperature in the finishing annealing, the core layer 2 will be severely eroded (with some parts being eroded to half its thickness), and when the corrosion reaches the eroded part, the corrosion will penetrate through the thickness of the sheet at an early stage by preferential corrosion of the sheet at the eroded part, and the sheet will have poor corrosion resistance. In addition, since the eroded parts have inferior strength compared to the non-eroded parts, the sheet will also suffer from poor properties including the reduced fatigue life.

When the finishing annealing is conducted and the period of the finishing annealing exceeds 5 hours, amount of the Zn diffusing from the sacrificial layer 3 to the core layer 2, and the amount of the Cu diffusing from the core layer 2 to the sacrificial layer 3 will be unduly high, and the difference in the electrical potential between the sacrificial layer 3 and the core layer 2 can not be ensured, and this results in the poor internal corrosion resistance. Accordingly, when the finishing annealing is conducted, the annealing should be conducted at a temperature of up to 300° C. and for a period of up to 5 hours.

In the present invention, other steps such as the step of relieving the strain may be carried out between, before, or after each of the steps as described above as long as the included step does not adversely affect other steps.

Next, the soaking heat treatment of the ingot used for the core layer and the second cold rolling carried out for controlling the crystal grain size after the brazing heat treatment to the range of at least 50 μm and less than 300 μm are described in detail.

<Conditions of the Soaking Heat Treatment: 440 to 570° C. for at Least 2 Hours>

The soaking heat treatment of the core layer 2 is conducted since various components that have been added to the core layer 2 are segregated in the core layer 2 in the as-casted state, and such segregation may result in the local melting during the brazing if it is rolled to the predetermined thickness after cladding with the filler layer 4 and the sacrificial layer 3. This step is also a critical step for controlling the grain size of the crystals after the brazing. When the temperature of the heat treatment is less than 440° C., cladding can not be accomplished since the temperature of the core layer 2 will be lower than 440° C. before starting the hot rolling.

On the other hand, when the temperature exceeds 570° C., the intermetallic compounds which precipitate in the core layer 2 will be coarse, and the growth of the recrystallizing crystal grains during the brazing will be inhibited. As a consequence, the filler diffuses into the grain boundary and erosion occurs by the local melting at the grain boundary. The filler required for the fillet formation will also be insufficient, and this results in the poor brazeability. The heat treatment of less than 2 hours is insufficient for reducing the segregation, and the resulting core layer 2 will be unsuitable.

By conducing the soaking heat treatment under such conditions, distribution of the Al—Mn, Al—Mn—Si, Al—Fe, Al—Fe—Si, and Al—Mn—Fe—Si-based intermetallic compounds in the core layer 2 can be controlled such that those having a diameter in terms of sphere of 0.65 to 15 μm is present at up to $5\times10^3$ grains per mm$^2$, and those having a diameter in terms of sphere in excess of 15 μm is present at up to 50 grains per mm$^2$.

<Cold Working Rate: 20 to 65%>

Control of the cold working rate is critical in suppressing the erosion in the brazing. When the cold working rate is less than 20%, subgrains will remain until the brazing, and the filler diffuses into the remaining subgrains to cause the erosion. When the erosion occurs, the filler would rather diffuse into the subgrains instead of flowing along the surface, and the filler necessary for the fillet formation will be insufficient, and this results in the poor brazeability. Density of the dislocation which serves the origin of the recrystallization in the brazing will also be reduced, and the reduced number of the recrystallization sites results in the increase in the crystal grain size. Furthermore, when the erosion occurs due to the insufficient cold working rate, the core layer 2 will be severely eroded (with some parts being eroded to half its thickness), and when the corrosion reaches the eroded part, the corrosion will penetrate throughout the thickness of the sheet at an early stage by preferential corrosion of the sheet at the eroded part, and the sheet will have poor corrosion resistance. In addition, since the eroded parts have inferior strength compared to the non-eroded parts, the sheet will also suffer from poor properties including the reduced fatigue life.

On the other hand, when the cold working rate exceeds 65%, density of the dislocation which serves the origin of the recrystallization in the brazing will increase, and this results in the increased number of recrystallized grains and smaller size of the crystal grain. As a consequence, the filler diffuses into the grain boundary and erosion occurs by the local melting at the grain boundary. The filler required for the fillet formation will also be insufficient, and this results in the poor brazeability.

In other words, the size of the recrystallized grains will be small when the temperature of the soaking heat treatment temperature is high and the cold working rate is also high, while the size of the recrystallized grain will be large when the temperature of the soaking heat treatment temperature and the cold working rate are low.

EXAMPLES

Next, the aluminum alloy clad sheet for a heat exchanger of the present invention is described in further detail by comparing the Examples within the scope of the present invention and Comparative Examples outside the scope of the present invention.

<Preparation of Test Piece>

First, the aluminum alloy for the core layer, the aluminum alloy for the sacrificial layer, and the aluminum alloy for the filler layer are respectively melted and casted by continuous casting. With regard to the core layer (the member for the core layer), surface grinding (surface smoothing treatment) and soaking heat treatment were conducted to produce an ingot for the core layer (the member for the core layer) having the predetermined thickness. With regard to the sacrificial layer (the member for the sacrificial layer) and the filler layer (the member for the filler layer), surface grinding (surface smoothing treatment) and soaking heat treatment were conducted to produce an ingot for the core layer and an ingot for the sacrificial layer, and these ingot for the sacrificial layer and ingot for the filler layer were respectively hot rolled to the predetermined thickness to produce the member for the sacrificial layer and the member for the filler layer. Next, the member for the sacrificial layer was disposed on one surface of the member for the core layer, and the member for the filler layer was disposed on the other surface of the member for the core layer, and the laminate was subjected to heat treatment (reheating) at 440° C. for 4 hours and hot rolling to produce a pressed sheet. The sheet was subjected to cold rolling (first cold rolling) and intermediate annealing at 380° C. for 2 hours, and then, cold rolling (second cold rolling) to produce an aluminum alloy clad sheet (test piece). Finish annealing was conducted for some test pieces.

Tables 1 and 2 show the composition of the filler layer, the sacrificial layer, and the core layer. In Tables 1 and 2, absence of the particular component is shown by "-", and the content outside the scope of the present invention is marked by an underline. Tables 3 and show conditions used in the soaking heat treatment of the core layer (the member for the core layer) as well as the conditions used in the final cold rolling and the finishing annealing of the laminate. In Tables 3 and 4, the test pieces which were not subjected to the finishing annealing are indicated by "-", and the conditions outside the scope of the present invention are marked by an underline.

TABLE 1

| | Test piece No. | Core layer Composition (mass %) | | | | | Thickness (μm) | Sacrificial layer Composition (mass %) | | | Thickness (μm) | Filler layer Composition (mass %) | Thickness (μm) |
|---|---|---|---|---|---|---|---|---|---|---|---|---|---|
| | | Si | Cu | Mn | Ti | Mg | | Si | Mn | Zn | | Si | |
| Example | 1 | 0.94 | 0.9 | 0.5 | 0.11 | 0.15 | 160 | 0.78 | 0.02 | 4.7 | 35 | 10 | 25 |
| | 2 | 0.98 | 0.8 | 0.2 | 0.11 | 0.18 | 220 | 0.8 | 1 | 4.6 | 40 | 8 | 20 |
| | 3 | 0.8 | 0.55 | 0.05 | 0.08 | 0.2 | 104 | 0.55 | 0.3 | 3.5 | 49 | 11 | 47 |
| | 4 | 0.7 | 0.8 | 0.59 | 0.2 | 0.2 | 174 | 0.7 | 0.1 | 4.3 | 25 | 10 | 51 |
| | 5 | 0.96 | 0.87 | 0.4 | 0.18 | 0.36 | 217 | 0.7 | 0.1 | 4.4 | 30 | 10 | 53 |
| | 6 | 0.97 | 0.84 | 0.59 | 0.17 | 0.3 | 115 | 0.7 | 0.001 | 4 | 35 | 10 | 50 |
| | 7 | 0.9 | 0.81 | 0.59 | 0.14 | 0.3 | 164 | 0.82 | 0.99 | 5.2 | 48 | 8 | 38 |
| | 8 | 0.8 | 0.55 | 0.59 | 0.08 | 0.4 | 223 | 0.55 | 0.3 | 3.5 | 35 | 11 | 42 |
| | 9 | 0.7 | 0.8 | 0.59 | 0.2 | 0.38 | 120 | 0.67 | 0.13 | 4.3 | 40 | 10 | 40 |
| | 10 | 0.51 | 0.52 | 0.59 | 0.05 | 0.05 | 188 | 0.52 | 0.02 | 3.1 | 26 | 7 | 36 |
| | 11 | 1.08 | 1.09 | 0.59 | 0.16 | 0.44 | 197 | 1.08 | 1.67 | 5.9 | 48 | 11.9 | 55 |
| | 12 | 0.91 | 0.81 | 0.59 | 0.12 | 0.2 | 97 | 0.68 | 0.12 | 4.3 | 48 | 10 | 55 |
| | 13 | 0.93 | 0.87 | 0.55 | 0.1 | 0.15 | 174 | 0.78 | 0.02 | 4 | 40 | 10 | 36 |
| | 14 | 0.96 | 0.84 | 0.3 | 0.1 | 0.18 | 226 | 0.82 | 0.99 | 4.5 | 30 | 8 | 44 |
| | 15 | 0.8 | 0.55 | 0.2 | 0.08 | 0.2 | 125 | 0.55 | 0.3 | 3.5 | 27 | 11 | 48 |
| | 16 | 0.7 | 0.8 | 0.11 | 0.2 | 0.2 | 178 | 0.7 | 0.1 | 3.9 | 33 | 10 | 39 |
| | 17 | 0.96 | 0.8 | 0.32 | 0.18 | 0.33 | 217 | 0.7 | 0.1 | 3.9 | 38 | 10 | 45 |
| | 18 | 0.9 | 0.78 | 0.25 | 0.2 | 0.3 | 117 | 0.78 | 0.01 | 3.9 | 42 | 10 | 41 |
| | 19 | 0.96 | 0.78 | 0.18 | 0.11 | 0.3 | 181 | 0.8 | 1 | 3.9 | 32 | 8 | 37 |
| | 20 | 0.8 | 0.55 | 0.24 | 0.08 | 0.4 | 205 | 0.55 | 0.3 | 3.5 | 41 | 11 | 54 |
| | 21 | 0.7 | 0.8 | 0.52 | 0.2 | 0.38 | 107 | 0.7 | 0.1 | 4.9 | 50 | 10 | 43 |
| | 22 | 0.51 | 0.52 | 0.37 | 0.05 | 0.05 | 149 | 0.52 | 0.02 | 3.1 | 49 | 7 | 52 |
| | 23 | 1.08 | 1.09 | 0.05 | 0.16 | 0.44 | 229 | 1.08 | 1.67 | 5.9 | 25 | 11.9 | 46 |

\* The remainder of the composition includes Al and inevitable impurities.

TABLE 2

| | Test piece No. | Core layer Composition (mass %) | | | | | Thickness (μm) | Sacrificial layer Composition (mass %) | | | Thickness (μm) | Filler layer Composition (mass %) | Thickness (μm) |
|---|---|---|---|---|---|---|---|---|---|---|---|---|---|
| | | Si | Cu | Mn | Ti | Mg | | Si | Mn | Zn | | Si | |
| Comparative Examples | 24 | 0.9 | 0.83 | 0.58 | 0.15 | — | 139 | 0.7 | 0.1 | 5.2 | 25 | 10 | 36 |
| | 25 | 0.88 | 0.9 | 0.58 | 0.17 | 0.2 | 133 | 0.6 | 0.2 | <u>2.5</u> | 31 | 11 | 36 |
| | 26 | 0.94 | 0.55 | 0.42 | 0.16 | 0.15 | 165 | 0.74 | — | 4 | 45 | 10 | 40 |
| | 27 | 0.8 | 0.55 | 0.55 | 0.16 | 0.2 | 119 | <u>0.05</u> | 0.3 | 3.5 | 35 | 11 | 46 |
| | 28 | 0.7 | 0.8 | 0.06 | <u>0.3</u> | 0.2 | 177 | 0.6 | 0.1 | 5.1 | 30 | 10 | 43 |
| | 29 | <u>1.15</u> | 0.83 | 0.34 | 0.12 | 0.35 | 223 | 0.6 | 0.1 | 5.1 | 38 | 10 | 39 |
| | 30 | 0.99 | <u>0.3</u> | 0.47 | 0.11 | 0.3 | 126 | 0.74 | 0.05 | 4 | 36 | 10 | 38 |
| | 31 | 0.93 | 0.51 | <u>0.65</u> | 0.11 | 0.3 | 160 | 0.8 | 1 | 4.9 | 42 | 8 | 48 |
| | 32 | 0.8 | 0.55 | 0.36 | 0.08 | <u>0.47</u> | 125 | 0.55 | 0.3 | 3.5 | 27 | 11 | 48 |
| | 33 | 0.93 | 0.82 | 0.55 | <u>0.02</u> | 0.35 | 217 | 0.7 | 0.2 | 3.8 | 38 | 10 | 45 |
| | 34 | 0.91 | <u>1.15</u> | 0.55 | 0.17 | 0.3 | 117 | 0.74 | 0.01 | 4 | 42 | 10 | 41 |
| | 35 | <u>0.3</u> | 0.88 | 0.55 | 0.17 | 0.3 | 181 | 0.8 | 1 | 4 | 48 | 8 | 37 |
| | 36 | 0.8 | 0.55 | 0.55 | 0.08 | 0.2 | 125 | <u>1.16</u> | 0.3 | 3.5 | 27 | 11 | 48 |
| | 37 | 0.7 | 0.8 | 0.55 | 0.2 | 0.2 | 178 | 0.6 | 0.2 | <u>6.5</u> | 33 | 10 | 39 |
| | 38 | 0.91 | 0.8 | 0.5 | 0.15 | 0.3 | 217 | 0.6 | <u>1.8</u> | 3.8 | 38 | 10 | 45 |

TABLE 2-continued

| Test piece No. | Core layer Composition (mass %) Si | Cu | Mn | Ti | Mg | Thickness (μm) | Sacrificial layer Composition (mass %) Si | Mn | Zn | Thickness (μm) | Filler layer Composition (mass %) Si | Thickness (μm) |
|---|---|---|---|---|---|---|---|---|---|---|---|---|
| 39 | 0.91 | 0.8 | 0.5 | 0.15 | 0.3 | 139 | 0.74 | 0.01 | 5.4 | <u>20</u> | 10 | 41 |
| 40 | 0.91 | 0.8 | 0.5 | 0.15 | 0.3 | 110 | 0.8 | 1 | 5.2 | <u>53</u> | 8 | 37 |
| 41 | 0.91 | 0.8 | 0.5 | 0.15 | 0.3 | 124 | 0.74 | 0.01 | 3.6 | 42 | 10 | <u>19</u> |
| 42 | 0.91 | 0.8 | 0.5 | 0.15 | 0.3 | 110 | 0.8 | 1 | 4.9 | 32 | 8 | <u>58</u> |
| 43 | 0.91 | 0.8 | 0.5 | 0.15 | 0.3 | 117 | 0.74 | 0.01 | 4 | 42 | 10 | 41 |
| 44 | 0.91 | 0.8 | 0.5 | 0.15 | 0.3 | 181 | 0.8 | 1 | 4.2 | 32 | 8 | 37 |
| 45 | 0.91 | 0.8 | 0.5 | 0.15 | 0.3 | 117 | 0.78 | 0.01 | 4 | 42 | 10 | 41 |
| 46 | 0.91 | 0.8 | 0.5 | 0.15 | 0.3 | 181 | 0.8 | 1 | 5 | 32 | 8 | 37 |
| 47 | 0.91 | 0.8 | 0.5 | 0.15 | 0.3 | 181 | 0.8 | 1 | 5 | 32 | 8 | 37 |
| 48 | 0.91 | 0.8 | 0.5 | 0.15 | 0.3 | 181 | 0.8 | 1 | 5 | 32 | 8 | 37 |
| 49 | 0.82 | 0.8 | <u>0.04</u> | 0.15 | 0.2 | 127 | 0.64 | 0.13 | 4.7 | 33 | 10 | 40 |
| 50 | 0.7 | 0.6 | 0.5 | 0.15 | — | 146 | 0.51 | 0.1 | 4 | 35 | 10 | <u>19</u> |

* The remainder of the composition includes Al and inevitable impurities.

TABLE 3

| | Test piece No. | Core layer Soaking heat treatment Temperature (° C.) | Time (h) | Laminate Second cold rolling Working rate (%) | Finish annealing Temperature (° C.) | Time (h) |
|---|---|---|---|---|---|---|
| Example | 1 | 450 | 2 | 21 | 200 | 5 |
| | 2 | 565 | 5 | 64 | 250 | 5 |
| | 3 | 500 | 5 | 55 | 200 | 3 |
| | 4 | 480 | 4 | 50 | — | — |
| | 5 | 520 | 6 | 45 | 300 | 3 |
| | 6 | 450 | 7 | 35 | — | — |
| | 7 | 560 | 8 | 28 | — | — |
| | 8 | 550 | 5 | 33 | — | — |
| | 9 | 470 | 2 | 40 | 230 | 4 |
| | 10 | 560 | 9 | 48 | 150 | 3 |
| | 11 | 490 | 4 | 60 | — | — |
| | 12 | 540 | 5 | 25 | — | — |
| | 13 | 530 | 6 | 58 | — | — |
| | 14 | 570 | 7 | 37 | — | — |
| | 15 | 500 | 9 | 44 | — | — |
| | 16 | 480 | 3 | 61 | 300 | 5 |
| | 17 | 440 | 4 | 57 | 270 | 4 |
| | 18 | 565 | 5 | 46 | — | — |
| | 19 | 510 | 11 | 26 | — | — |
| | 20 | 480 | 12 | 38 | — | — |
| | 21 | 470 | 14 | 62 | 290 | 4 |
| | 22 | 500 | 4 | 23 | 200 | 5 |
| | 23 | 540 | 13 | 46 | — | — |

TABLE 4

| | Test piece No. | Core layer Soaking heat treatment Temperature (° C.) | Time (h) | Laminate Second cold rolling Working rate (%) | Finish annealing Temperature (° C.) | Time (h) |
|---|---|---|---|---|---|---|
| Comparative Examples | 24 | 510 | 6 | 30 | — | — |
| | 25 | 510 | 6 | 30 | — | — |
| | 26 | 450 | 4 | 21 | 200 | 5 |
| | 27 | 500 | 5 | 55 | 200 | 3 |
| | 28 | 480 | 4 | 50 | — | — |
| | 29 | 520 | 6 | 45 | 300 | 3 |
| | 30 | 450 | 7 | 35 | — | — |
| | 31 | 560 | 8 | 28 | — | — |
| | 32 | 560 | 9 | 48 | 210 | 3 |
| | 33 | 540 | 5 | 25 | — | — |
| | 34 | 530 | 6 | 58 | — | — |
| | 35 | 570 | 7 | 37 | — | — |
| | 36 | 550 | 6 | 35 | 210 | 4 |
| | 37 | 530 | 4 | 40 | — | — |
| | 38 | 480 | 5 | 25 | 220 | 5 |
| | 39 | 490 | 6 | 30 | — | — |
| | 40 | 560 | 5 | 50 | — | — |
| | 41 | 450 | 6 | 45 | — | — |
| | 42 | 480 | 5 | 28 | 250 | 3 |
| | 43 | <u>400</u> | 6 | 30 | — | — |
| | 44 | <u>580</u> | 4 | 35 | 200 | 3 |
| | 45 | 480 | 5 | <u>15</u> | — | — |
| | 46 | 510 | 6 | <u>70</u> | 260 | 4 |
| | 47 | 510 | 6 | 30 | <u>320</u> | 4 |
| | 48 | 510 | 6 | 30 | 250 | <u>6</u> |
| | 49 | 510 | 6 | 30 | — | — |
| | 50 | 510 | 6 | 30 | — | — |

The thus prepared aluminum alloy clad sheets for a heat exchanger (test pieces) were evaluated for their properties by conducting the tests as described below. Crystal grain size of the core layer after the brazing heat treatment, and number of the intermetallic compounds having a diameter in terms of sphere of 0.65 to 15 μm and those having a diameter in terms of sphere in excess of 15 μm were also measured. The brazing was conducted by brazing at 595° C. for 3 minutes, and cooling the test piece immediately after the brazing. In the brazing, the test piece was maintained at the high temperature of 380° C. or higher for 20 minutes.

<Brazeability>

Figure 3:
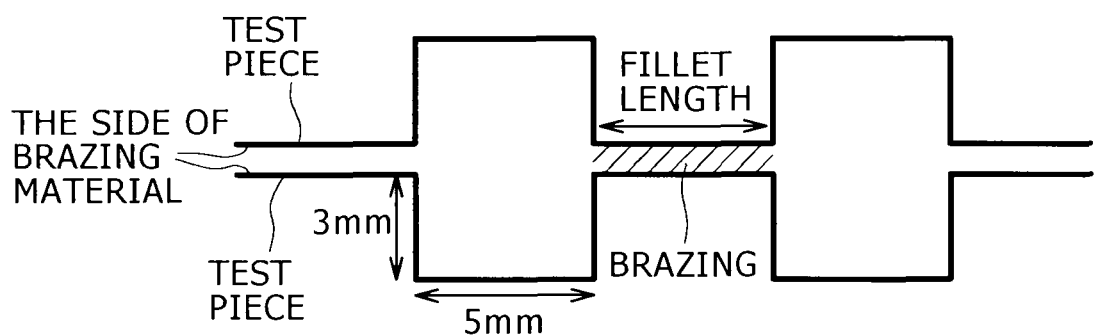
FIG. 3 is a view schematically showing the test method for evaluating brazeability in the Example.

Brazeability was measured by using the test piece as shown in FIG. 3 by placing the test pieces one on another so that the filler layer becomes in contact with each other. Length of the fillet after the brazing was measured. The brazeability was evaluated "good" (A) when the fillet length was at least 4 mm, and "bad" (B) when the fillet length was less than 4 mm. Amount of the flux coated on the filler layer was 5 (±0.2) g/m².

<Erosion Resistance>

The test piece before the brazing was subjected to a cold rolling at a working rate of 0, 10, or 20%, and after the cold rolling at each working rate, brazing was conducted by drop test system. The cross section of the test piece was microscopically observed after the brazing to evaluate the erosion. The erosion resistance was evaluated "good" (A) when the test piece was eroded to less than half of the thickness of the core layer in all working rates, and "bad" (B) when the test piece was eroded to about half of the thickness of the core layer in any of the working rates.

<Corrosion Resistance>

The corrosion resistance evaluated was the corrosion resistance on the side of the sacrificial layer (internal corrosion resistance). More specifically, the test piece was brazed by the drop test system, and cut into the size of 50 mm (width)×60 mm (length). A masking seal of 60 mm (width)×70 mm (length) was adhered to the test piece to cover the entire surface of the filler layer and along the edges (5 mm) of the sacrificial layer (the margin of the seal was folded onto the side of the sacrificial layer) to prevent intrusion of the solution for use as the test piece. The immersion test was conducted by repeating 90 cycles of immersing the test piece in the test solution (an aqueous solution containing $Na^+$ at 118 ppm, $Cl^-$ at 58 ppm, $SO_4^{2-}$ at 60 ppm, $Cu^{2+}$ at 1 ppm, and $Fe^{3+}$ at 30 ppm) at 88° C. for 8 hours, and allowing to cool to room temperature and allowing to stand at room temperature for 16 hours, and the development of the corrosion was observed. The corrosion resistance was evaluated "good" (A) when the corrosion did not penetrate the test piece, and "bad" (B) when the corrosion penetrated the test piece.

<Fatigue Life>

Figure 4:
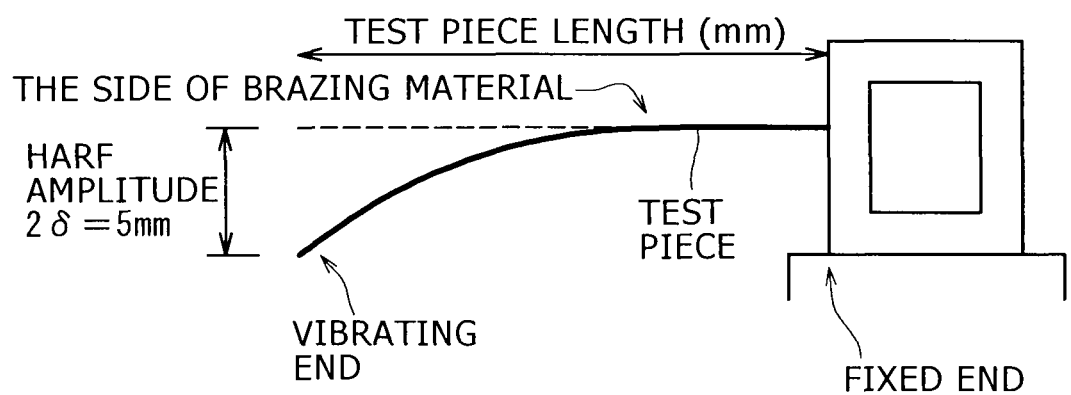
FIG. 4 is a view schematically showing the test method for evaluating fatigue life in the Example.

The brazing test piece was processed into a test piece of 10 (width) mm×100 mm (length), and the test piece was placed with the side of the filler layer facing upward as shown in FIG. 4. The distance between the fixed end and the vibrating end was adjusted so that the bending stress calculated by the following formula would be 57.9 kg/mm².

Calculation of the bending stress:

$$\sigma_B = (3/2) \times \{(E \times h)/l^2\} \times \delta$$

wherein E is Young's modulus (kg/mm), h is thickness (mm) of the test piece, l is the length (mm) of the test piece, and 2δ is half amplitude (5 mm).

Next, a cantilever vibration test was conducted by moving the vibrating end 5 mm downward and allowing it to move back to its original position. In this test, the vibrating end was moved at a constant distance (half amplitude) of 5 mm. The fatigue life was evaluated "good" (A) when the number of vibration before the breakage was $5 \times 10^3$ or more, and "bad" (B) when the number was less than $5 \times 10^3$.

<Post-Brazing Strength>

A hole was punctured at the upper end (in axial direction) of the test piece having the size of 100 mm (width)×250 mm (length), and a rod was inserted through the hole so that the sample hangs down from the rod (drop test system). Brazing heat treatment was carried out by placing the sample in a brazing furnace, heating at a temperature elevation rate of 15° C./minute, maintaining at 600° C. for 5 minute, and cooling at a cooling rate of 200° C./minute. 3 JIS No. 5 test pieces were cut out from each test piece and worked, and after leaving at room temperature (25° C.) for 1 week, tensile test was conducted to measure the tensile strength. The post-braze strength was evaluated "good" (A) when it was 160 MPa or higher, and "bad" (B) at less than 160 MPa.

<Crystal Grain Size of the Core Layer After the Brazing Heat Treatment>

Crystal grain size of the core layer was measured by the procedure described in JIS H: 0501 7. Cutting method. More specifically, picture of the surface of the core layer was taken by an optical microscope, and after drawing a line on the picture in the direction of the rolling, the number of crystal grains on the line was counted.

<Number of the Intermetallic Compound Having the Size of 0.65 to 15 μm and the Number of Intermetallic Compound With the Size Exceeding 15 μm>

The surface of the core layer was observed by a SEM at a magnification of 500 folds for 20 visual fields to evaluate distribution of the intermetallic compounds and count the number of the intermetallic compounds per 1 mm².

The test results are shown in Tables 5 and 6. In Tables 5 and 6, "-" indicates that the sample could not be evaluated, and the crystal grain size of the core layer outside the scope of the present invention is marked by an underline.

TABLE 5

| | Test piece No. | Brazeability | Erosion resistance | Corrosion resistance | Fatigue life (Fatigue test) (×10³ cycles) | Evaluation | Post-brazing strength (MPa) | Evaluation | Crystal grain size of core layer (μm) | Intermetallic compound (0.65 to 15 μm) (grains/mm²) | (In excess of 15 μm) (grains/mm²) |
|---|---|---|---|---|---|---|---|---|---|---|---|
| Example | 1 | A | A | A | 5.6 | A | 170 | A | 230 | 4320 | 28 |
| | 2 | A | A | A | 11.6 | A | 200 | A | 53 | 1250 | 6 |
| | 3 | A | A | A | 12.0 | A | 165 | A | 62 | 1070 | 3 |
| | 4 | A | A | A | 8.0 | A | 185 | A | 80 | 3350 | 17 |
| | 5 | A | A | A | 7.8 | A | 230 | A | 100 | 3890 | 16 |
| | 6 | A | A | A | 5.0 | A | 203 | A | 180 | 4985 | 31 |
| | 7 | A | A | A | 5.1 | A | 223 | A | 120 | 4920 | 30 |
| | 8 | A | A | A | 6.4 | A | 241 | A | 110 | 4710 | 24 |
| | 9 | A | A | A | 5.3 | A | 216 | A | 125 | 4445 | 22 |
| | 10 | A | A | A | 6.5 | A | 165 | A | 58 | 4023 | 20 |
| | 11 | A | A | A | 6.7 | A | 250 | A | 74 | 4038 | 20 |
| | 12 | A | A | A | 6.0 | A | 166 | A | 140 | 4860 | 38 |
| | 13 | A | A | A | 6.1 | A | 190 | A | 68 | 4563 | 36 |
| | 14 | A | A | A | 6.4 | A | 226 | A | 130 | 3964 | 18 |
| | 15 | A | A | A | 7.6 | A | 187 | A | 92 | 2780 | 14 |
| | 16 | A | A | A | 10.2 | A | 195 | A | 85 | 1560 | 8 |
| | 17 | A | A | A | 8.2 | A | 238 | A | 63 | 3510 | 13 |

TABLE 5-continued

| Test piece No. | Brazeability | Erosion resistance | Corrosion resistance | Fatigue life (Fatigue test) ($\times 10^3$ cycles) | Evaluation | Post-brazing strength (MPa) | Evaluation | Crystal grain size of core layer (μm) | Intermetallic compound (0.65 to 15 μm) (grains/mm$^2$) | (In excess of 15 μm) (grains/mm$^2$) |
|---|---|---|---|---|---|---|---|---|---|---|
| 18 | A | A | A | 9.4 | A | 213 | A | 53 | 2642 | 10 |
| 19 | A | A | A | 8.7 | A | 215 | A | 170 | 3106 | 11 |
| 20 | A | A | A | 9.5 | A | 243 | A | 182 | 2279 | 8 |
| 21 | A | A | A | 6.5 | A | 204 | A | 140 | 3546 | 17 |
| 22 | A | A | A | 6.3 | A | 171 | A | 210 | 3812 | 18 |
| 23 | A | A | A | 10.8 | A | 252 | A | 77 | 1035 | 5 |

TABLE 6

| | Test piece No. | Brazeability | Erosion resistance | Corrosion resistance | Fatigue life (Fatigue test) ($\times 10^3$ cycles) | Evaluation | Post-brazing strength (MPa) | Evaluation | Crystal grain size of core layer (μm) | Intermetallic compound (0.65 to 15 μm) (grains/mm$^2$) | (In excess of 15 μm) (grains/mm$^2$) |
|---|---|---|---|---|---|---|---|---|---|---|---|
| Comparative Examples | 24 | A | A | A | 5.3 | A | 155 | B | 150 | 4680 | 25 |
| | 25 | A | A | B | 5.3 | A | 195 | A | 150 | 4650 | 15 |
| | 26 | A | A | B | 5.9 | A | 196 | A | 230 | 4023 | 20 |
| | 27 | A | A | B | 9.8 | A | 183 | A | 62 | 1430 | 22 |
| | 28 | A | A | B | 11.4 | A | 199 | A | 80 | 1008 | 8 |
| | 29 | — | — | — | — | — | — | — | — | — | — |
| | 30 | A | A | B | 8.2 | A | 198 | A | 180 | 3438 | 18 |
| | 31 | A | A | A | 4.8 | B | 233 | A | 112 | 5420 | 58 |
| | 32 | B | A | A | 7.7 | A | 248 | A | 58 | 3198 | 14 |
| | 33 | A | A | B | 5.5 | A | 254 | A | 140 | 4561 | 13 |
| | 34 | — | — | — | — | — | — | — | — | — | — |
| | 35 | A | A | B | 5.4 | A | 178 | A | 130 | 4723 | 9 |
| | 36 | — | — | — | — | — | — | — | — | — | — |
| | 37 | — | — | — | — | — | — | — | — | — | — |
| | 38 | A | A | B | 5.2 | A | 246 | A | 195 | 4856 | 19 |
| | 39 | B | A | B | 5.2 | A | 231 | A | 180 | 4856 | 19 |
| | 40 | A | A | B | 5.2 | A | 165 | A | 68 | 4856 | 19 |
| | 41 | B | A | A | 5.2 | A | 220 | A | 112 | 4856 | 19 |
| | 42 | B | B | — | — | — | — | — | 200 | 4856 | 19 |
| | 43 | — | — | — | — | — | — | — | — | — | — |
| | 44 | B | B | A | 4.8 | B | 245 | A | 40 | 4856 | 61 |
| | 45 | B | B | B | 1.2 | B | 157 | B | 310 | 4856 | 19 |
| | 46 | B | B | A | 8.2 | A | 236 | A | 45 | 4856 | 19 |
| | 47 | B | B | B | 2.4 | B | 201 | A | 150 | 4856 | 19 |
| | 48 | A | A | B | 5.2 | A | 231 | A | 150 | 4856 | 19 |
| | 49 | A | A | A | 3.5 | B | 158 | B | 310 | 925 | 3 |
| | 50 | B | A | A | 5.1 | A | 159 | B | 127 | 3985 | 16 |

As shown in Table 5, test piece Nos. 1 to 23 which were within the scope of the present invention were excellent in all of the brazeability, erosion resistance, corrosion resistance, fatigue life, and post-braze strength.

On the other hand, No. 24 in which the core layer did not contain the Mg exhibited inferior post-braze strength. No. 25 in which the sacrificial layer had the Zn concentration below the lower limit had poor corrosion resistance since difference in the electrical potential between the sacrificial layer and the core layer was insufficient. No. 26 in which no Mn was added in the sacrificial layer also had poor corrosion resistance since elementary Si precipitated at the grain boundary. No. 27 in which the sacrificial layer had the Si concentration below the lower limit had poor corrosion resistance since the Al—Mn-based compound precipitated at the grain boundary. No. 28 in which the core layer had the Ti concentration exceeding the upper limit had poor corrosion resistance since coarse intermetallic compounds were formed during the casting.

No. 29 in which the core layer had the Si concentration exceeding the upper limit could not be evaluated since the clad sheet melted during the brazing. No. 30 in which the core layer had the Cu concentration below the lower limit had poor corrosion resistance since the difference in the electrical potential between the core layer and the sacrificial layer was insufficient. No. 31 in which the core layer had the Mn concentration exceeding the upper limit had poor fatigue life due to excessive formation of the intermetallic compound. No. 32 in which the core layer had the Mg concentration exceeding the upper limit had poor brazeability due to the reaction between the flux and the Mg.

No. 33 in which the core layer had the Ti concentration below the lower limit had poor corrosion resistance due to the lack of the laminar distribution of the Ti. No. 34 in which the core layer had the Cu concentration exceeding the upper limit could not be evaluated due to the melting of the clad sheet during the brazing. No. 35 in which the core layer had the Si concentration below the lower limit had poor corrosion resistance due to precipitation of the Al—Mn-based compound at the grain boundary. No. 36 in which the sacrificial layer had the Si concentration exceeding the upper limit could not be evaluated due to the melting of the clad sheet during the brazing.

No. 37 in which the sacrificial layer had the Zn concentration exceeding the upper limit could not be evaluated due to the melting of the clad sheet during the brazing. No. 38 in which the sacrificial layer had the Mn concentration exceeding the upper limit had poor corrosion resistance due to formation of the intermetallic compounds having a relatively large grain size in great numbers in the sacrificial layer.

No. 39 in which the sacrificial layer had a thickness below the lower limit had poor corrosion resistance due to the difficulty of realizing the sufficient difference in the electrical potential between the sacrificial layer and the core layer. The brazeability was also poor due to increase in the amount of the Mg diffusing from the core layer. No. 40 in which the sacrificial layer had a thickness exceeding the upper limit had poor corrosion resistance due to decrease in the electrical potential of the clad sheet itself which resulted in the increase in the corrosion rate. In addition, the post-braze strength of the clad sheet was relatively low due to the excessively thick sacrificial layer.

No. 41 in which the filler layer had the thickness below the lower limit had poor brazeability due to excessive diffusion of the Mg from the core layer. No. 42 in which the filler layer had the thickness exceeding the upper limit had poor brazeability and poor erosion resistance due to increase in the flow of the filling. In addition, the sample could not be used as a test piece in the evaluation of corrosion resistance, fatigue life, and post-braze strength due to the melting of the core layer during the brazing.

In No. 43 in which the core layer had been subjected to the soaking heat treatment at a temperature below the lower limit, the clad could not be pressed into a sheet product. No. 44 in which the core layer had been subjected to the soaking heat treatment at a temperature exceeding the upper limit had poor erosion resistance and poor brazeability due to the excessively small crystal grain size of the core layer crystal grain size. In this case, the intermetallic compound exceeding 15 µm was present in excess of 50 mm², and the fatigue life was poor.

No. 45 which had been worked to the cold rolling rate below the lower limit suffered from erosion due to the remaining of the subgrains, and this resulted in the poor erosion resistance and poor brazeability. The number of recrystallization sites also reduced, and the crystal grains became coarse, and this resulted in the poor post-braze strength. As the consequence of the erosion, the core layer was severely eroded (with some parts being eroded to as far as half its thickness), and in the corrosion resistance test, the corrosion which reached the erosion site resulted in the preferential corrosion at the erosion site, and the corrosion penetrated through the sample at an early stage. This resulted in the poor corrosion resistance. In the evaluation of the fatigue life, the strength of the eroded site was inferior to the non-eroded site, and this resulted in the unfavorable loss of the fatigue resistance, and hence, in the shorter fatigue life.

No. 46 which had been worked to the cold rolling rate exceeding the upper limit had poor erosion resistance and poor brazeability since the crystal grain size of the core layer was excessively small.

No. 47 in which the temperature in the finishing annealing exceeded the upper limit underwent partial recrystallization and erosion, and this resulted in the poor erosion resistance and poor brazeability. As the consequence of the erosion, the core layer was severely eroded (with some parts being eroded to as far as half its thickness), and in the corrosion resistance test, the corrosion which reached the erosion site resulted in the preferential corrosion at the erosion site, and the corrosion penetrated through the sample at an early stage. This resulted in the poor corrosion resistance. In the evaluation of the fatigue life, the strength of the eroded site was inferior to the non-eroded site, and this resulted in the unfavorable loss of the fatigue resistance, and hence in the shorter fatigue life.

In No. 48 in which the time of the finishing annealing exceeded the upper limit, increased amount of the Zn in the sacrificial layer and the Cu in the core layer diffused, and difference in the electrical potential of the sacrificial layer and the core layer after the brazing became insufficient, and this resulted in the poor corrosion resistance. In No. 49 in which the core layer had the Mn concentration below the lower limit, the number of intermetallic compounds that the Mn formed with the Al and the Si reduced, and the crystal grains after the brazing became coarse, and this resulted in the greatly reduced post-braze strength and poor fatigue life. No. 50 in which the filler layer had a thickness below the lower limit suffered from poor brazeability since the sample could not be sufficiently brazed. Absence of the Mg in the core layer resulted in the poor post-braze strength.

In the foregoing, the present invention has been described by means of the preferred embodiments and Examples. The present invention, however, is not limited to such preferred embodiments and Examples, and it may be improved or modified without deviating from the spirit of the present invention, and such improvement or modification are within the scope of the present invention.

What is claimed is:

1. An aluminum alloy clad sheet for a heat exchanger comprising a core layer, a sacrificial layer formed on one surface of the core layer, and a filler layer comprising an Al—Si based alloy formed on the other surface of the core layer, wherein the core layer comprises 0.5 to 1.1 mass % Si, 0.5 to 1.1 mass % Cu, at least 0.05 mass % and less than 0.6 mass % Mn, 0.05 to 0.25 mass % Ti, up to 0.45 mass % Mg, and the remainder of Al and inevitable impurities, the sacrificial layer comprises in excess of 0.5 mass % and up to 1.1 mass % Si, 0.001 to 1.7 mass % Mn, 3.0 to 6.0 mass % Zn, and the remainder of Al and inevitable impurities, the core layer has a crystal grain size after brazing heat treatment at 595° C. for 3 minutes of at least 50 µm and less than 300 µm the filler layer has a thickness of 20 to 55 µm, and the sacrificial layer has a thickness of 25 to 50 µm, and grains of intermetallic compounds selected from the group consisting of Al—Mn, Al—Mn—Si, Al—Fe, Al—Fe—Si, and Al—Mn—Fe—Si-based intermetallic compounds having a grain diameter of at least 0.65 µm are present in the core layer and are distributed such that those having a grain diameter of 0.65 to 15 µm are present in the core layer in an amount not exceeding $5 \times 10^3$ grains per mm², and those having a grain diameter in excess of 15 µm are present in the core layer in an amount not exceeding 50 grains per mm².

2. An aluminum alloy clad sheet for a heat exchanger comprising a core layer, a sacrificial layer formed on one surface of the core layer, and a filler layer comprising an Al—Si based alloy formed on the other surface of the core layer, wherein the core layer comprises:

Si: 0.5 to 1.1 mass %,

Cu: 0.5 to 1.1 mass %,

Mn: at least 0.05 mass % and less than 0.6 mass %,

Ti: 0.05 to 0.25 mass %,
Mg: up to 0.45 mass %, and
the remainder of Al and inevitable impurities;
the sacrificial layer comprises:
Si: in excess of 0.5 mass % and up to 1.1 mass %,
Mn: 0.001 to 1.7 mass %,
Zn: 3.0 to 6.0 mass %, and
the remainder of Al and inevitable impurities,
the core layer has a crystal grain size after brazing heat treatment at 595° C. for 3 minutes of at least 50 μm and less than 300 μm,
the filler layer has a thickness of 20 to 55 μm,
the sacrificial layer has a thickness of 25 to 50 μm, and
grains of intermetallic compounds selected from the group consisting of Al—Mn, Al—Mn—Si, Al—Fe, Al—Fe—Si, and Al—Mn—Fe—Si-based intermetallic compounds having a grain diameter of at least 0.65 μm are present in the core layer and are distributed such that those having a grain diameter of 0.65 to 15 μm are present in the core layer in an amount from 1035 to 5000 grains per mm$^2$, and those having a grain diameter in excess of 15 μm are present in the core layer in an amount from 3 to 50 grains per mm$^2$.

3. An aluminum alloy clad sheet for a heat exchanger according to claim 2, wherein the amount of Si in the sacrificial layer is in excess of 0.6 mass % and up to 1.0 mass %.

4. An aluminum alloy clad sheet for a heat exchanger according to claim 2, wherein the amount of Fe present in the core layer is up to 0.2 mass %.

* * * * *